(12) United States Patent
Heed

(10) Patent No.: US 6,168,770 B1
(45) Date of Patent: Jan. 2, 2001

(54) METHOD OF REMOVING NITROGEN OXIDES FROM A GAS FLOW BY USING A COMBUSTION ENGINE

(75) Inventor: Björn Heed, Utlandagatan 19, S-412 61, Göteborg (SE)

(73) Assignee: Bjorn Heed (SE)

( * ) Notice: Under 35 U.S.C. 154(b), the term of this patent shall be extended for 0 days.

(21) Appl. No.: 08/850,020

(22) Filed: Apr. 30, 1997

Related U.S. Application Data

(63) Continuation of application No. 08/557,367, filed on Nov. 13, 1995, now abandoned, which is a continuation of application No. 08/211,858, filed on May 23, 1994, now abandoned.

(30) Foreign Application Priority Data

Oct. 16, 1991 (SE) .................................................. 9103008
Aug. 24, 1992 (WO) .................................. PCT/SE92/00576

(51) Int. Cl.$^7$ .................................................. C01B 21/00
(52) U.S. Cl. .............................................................. 423/235
(58) Field of Search ................................ 423/239.1, 235

(56) References Cited

U.S. PATENT DOCUMENTS

| | | | |
|---|---|---|---|
| 4,328,020 | * | 5/1982 | Hughes ................................. 423/235 |
| 4,372,770 | * | 2/1983 | Krumwiede ........................... 423/235 |
| 4,423,017 | * | 12/1983 | Dean ..................................... 423/235 |
| 4,602,673 | * | 7/1986 | Michelfelder et al. ............ 423/239.1 |
| 4,678,643 | * | 7/1987 | Fetzer ................................... 422/175 |
| 4,726,302 | * | 2/1988 | Hein et al. ............................ 423/237 |
| 4,741,690 | * | 5/1988 | Heed ......................................... 431/7 |
| 4,834,962 | * | 5/1989 | Ludwig ............................. 423/239.1 |
| 4,839,147 | * | 6/1989 | Lindbauer ......................... 423/239.1 |
| 4,898,530 | * | 2/1990 | Wills et al. ........................... 423/237 |
| 5,401,479 | * | 3/1995 | Matros et al. .................... 423/239.1 |

FOREIGN PATENT DOCUMENTS

| | | |
|---|---|---|
| 441623 | 10/1985 | (SE) . |
| 466433 | 2/1992 | (SE) . |
| 8910182 | 11/1989 | (WO) . |
| 9005578 | 5/1990 | (WO) . |

* cited by examiner

*Primary Examiner*—Tom Dunn
(74) *Attorney, Agent, or Firm*—Orum & Roth

(57) ABSTRACT

The invention concerns a method of removing nitrogen oxides from a gas flow by using a combustion exchanger. Reducing nitrogen compounds are mixed with the gas before the latter is treated in the combustion exchanger.

7 Claims, No Drawings

METHOD OF REMOVING NITROGEN OXIDES FROM A GAS FLOW BY USING A COMBUSTION ENGINE

This application is a continuation of Ser No. 08/557,367, filed Nov. 13, 1995, now abandoned, which is a continuation of Ser. No. 08/211,858, filed May 23, 1994, now abandoned.

Most combustion systems incorporating combustion engines emit exhausts containing nitrogen oxides. Emission of nitrogen oxides into the atmosphere is a potential danger to the environment that has many aspects, such as excessive fertilization, acidification, direct poisonous effects and secondary formation of poisonous substances, such as photochemical oxidants, for example.

The exhausts from combustion systems mostly contain a certain oxygen surplus originating from the combustion stage and they are oxidants by nature, which makes it difficult to reduce the nitrogen oxides by using ordinary reducing agents. However, one has found that it is quite possible to employ various method of what is known as selective reduction of the nitrogen oxides. As the reducing agent is used ammonia, carbamide or urea or other substances that contain nitrogen, such as amines. To simplify, the method could be said to involve reacting positive valence nitrogen in nitrogen oxides with negative valence nitrogen to form nitrogen of zero valence, i.e. harmless nitrogen gas molecules.

To allow such reactions to be utilized does, however, require either medium high temperatures (200–500° C.) and the effects of a stationary catalyst in honeycomb or particle-bed form, a method known as selective catalytic reduction, SCR, or the effect may be achieved without stationary catalysts but in this case considerably higher temperatures (500–900° C.) are required. By analogy, the latter method usually is referred to as selective non-catalytic reduction, SNCR.

Whichever method is adopted, it is necessary to pay attention to and carefully control the amount of reducing agent that is added in order to avoid excessive effluents of such agents, too, which are not either quite harmless. The reducing agents not spent in the reaction with nitrogen oxides will exit together with the gas stream as so called "slip". Sometimes, particularly in the case of SNCR, it is disadvantageous to have to work at comparatively high temperatures. Heating of large volumes of gas might be very expensive and entail considerable operation costs.

In accordance with the teaching of the subject invention a combustion exchanger (European Patent 218 590) may be used to reduce the nitrogen oxide contents in a gas flow. This eliminates the problem of slip in reducing agents while at the same time the heating costs are kept low.

The method could be described as follows: When the gas flow does not contain suitable reducing agents, such agents are added and are mixed into the gas flow. The latter is then passed through a combustion exchanger wherein the gas is heated successively up to a high temperature level, whereafter it is successively cooled to a temperature level close to the starting temperature. Since heat can be borrowed only temporarily by the gas and the main portion of the heat is immediately recovered by the combustion exchanger, the energy comsumption of this heat treatment is low.

The gas is heated successively, and thus it will pass through the temperature range within which the reaction of nitrogen oxide reduction occurs. Thus, amounts of reducing agents are being spent during the desired reaction process, any excess amounts of reducing agent being left in the gas. However, the gas is thereafter heated further to a temperature ensuring reaction also of these excess amounts, which are destroyed through reaction with the oxygen contained in the gas.

To summarize, the treatment in the combustion exchanger comprises both reduction reactions and oxidation reactions, eliminating nitrogen oxides as well as unspent nitrogen oxide reducing agents. The oxidation step therefore could provide the added advantage of removing also other pollutants that can be oxidized, such as carbon monoxide, hydrocarbons, hydrogen gas, and so on.

In the case of gas mixtures, and particularly with respect to the components therein that can be oxidized, the selective reduction of nitrogen oxides that is primarily aimed for should, for optimum efficiency, be effected at different temperature levels, depending on the composition of the gas. The optimum temperature further depends on the reducing agent that is used. In this respect the use of a combustion exchanger has the advantage of exposing the gas mixtures to all relevant temperatures, and consequently the chances of reaction are very favourable. In other words, the composition of the gas need not be known beforehand, nor is it necessary to adapt the heating to different situations.

The nitrogen oxide reducing agents that are added to the gas flow could be in gaseous form, for instance ammonia from a pressurized vessel. This makes admixture into the gas flow prior to entrance into the combustion exhanger easy. Since the added amount normally is small in comparison with the volume of the gas, the addition could also be in the form of a liquid which is vaporized as it is admixed with the gas flow. In this case, the liquid could either be in the form of an essentially pure substance or in the form of a liquid solution of the active ingredient.

The addition need not necessarily consist of one single active substance. Since the treatment in the combustion exchanger involves treatment at all relevant temperature levels, mixtures of several different components having different optimum reaction temperatures, could be used without disadvantage. The addition could also contain a number of irrelevant components without disturbance. Those not used for the nitrogen oxide reduction process are destroyed at higher temperature levels. For this reason it may be economically advantageous as well as environmentally safe to use urine and liquid manure for the nitrogen oxide reduction in accordance with the method of the invention.

What is claimed is:

1. A non-catalytic method of removing nitrogen oxides, excess nitrogen oxide reducing agents, and combustible pollutants from a stream of polluted gas by treating said polluted gas in a heated combustion exchanger, said polluted gas comprising nitrogen oxide, oxygen and other pollutants that oxidize, said other pollutants being hydrogen, carbon monoxide, and hydrocarbons, said combustion exchanger for gradually heating and gradually cooling said polluted gas therein, and having a gas entry and a gas exist for communicating said gas therethrough, said combustion exchanger having a central portion maintained at a temperature for decomposing said other pollutants and said reducing agent through an oxidation reaction, said temperature at said gas entry and exit relatively cooler than at said central portion, the method comprising the steps of:

introducing a supply of a nitrogen oxide reducing agent into said polluted gas before said polluted gas enters said combustion exchanger, thereby forming a mixture;

flowing said mixture through said combustion exchanger, said mixture having an entrance temperature when entering said combustion exchanger;

gradually heating the mixture from said entrance temperature to a first temperature in a part of said combustion exchanger between said inlet and said central portion, wherein said nitrogen oxide constituents within said polluted gas of said mixture are thermally reduced into elemental nitrogen through a reduction reaction with said reducing agent as said mixture travels through said combustion exchanger;

further heating said gas stream, which contains said combustible pollutants and a remainder of said reducing agent which remains after said nitrogen oxide constituents are eliminated, to such a temperature within said central portion of said combustion exchanger, so that said pollutants and said remainder of said reducing agent are eliminated by an oxidation reaction with a remainder of oxygen in the gas stream after occurrence of said reduction of said nitrogen oxides, thereby forming a cleaned gas;

gradually cooling said cleaned gas from said temperature at said central portion to said exit gas temperature thereby recovering heat from said cleaned gas into said combustion exchanger as said gas travels from said central portion to said gas exit.

2. The method as claimed in claim 1, wherein the nitrogen oxide reducing agent is sprayed into the gas stream.

3. The method as claimed in claim 1, wherein the nitrogen oxide reducing agent is a liquid solution sprayed into and vaporized in the gas stream.

4. The method as claimed in claim 1, wherein the nitrogen oxide reducing agent is a liquid solution of urea sprayed into and vaporized in the gas stream.

5. The method as claimed in claim 1, wherein animal urine and animal liquid manure are used as the nitrogen oxide reducing agent.

6. The method of claim 13, further including the step of reducing a temperature of the gas constituents and the reducing agent to a temperature of said polluted gas by passing said gas constituents and the reducing agent to said exit, wherein heat is released from the gas and is returned to the combustion exchanger.

7. A new use for a combustion exchanger wherein said combustion exchanger is used to remove nitrogen oxides, excess nitrogen oxide reducing agents, and combustible pollutants from a stream of a polluted gas, said polluted gas comprising nitrogen oxide, oxygen and other pollutants that oxidize, said other pollutants being hydrogen, carbon monoxide, and hydrocarbons, said combustion exchanger having a gas entry and a gas exit for communicating said gas therethrough, said combustion exchanger having a central portion maintained at a temperature for decomposing said other pollutants and said reducing agent through an oxidation reaction, said temperature of said gas entry and exit relatively cooler than at said central portion, the new use comprising the steps of:

introducing a supply of a nitrogen oxide reducing agent into said polluted gas before said polluted gas enters said combustion exchanger, thereby forming a mixture;

flowing said mixture through said combustion exchanger, said mixture having an entrance temperature when entering said combustion exchanger;

gradually heating the mixture from said entrance temperature to a first temperature in a part of said combustion exchanger between said inlet and said central portion, wherein said nitrogen oxide constituents within said polluted gas of said mixture are thermally reduced into elemental nitrogen through a reduction reaction with said reducing agent as said mixture travels through said combustion exchanger;

further heating said gas stream, which contains said combustible pollutants and a remainder of said reducing agent which remains after said nitrogen oxide constituents are eliminated, to such a temperature within said central portion of said combustion exchanger, so that said pollutants and said remainder of said reducing agent are eliminated by an oxidation reaction with a remainder of oxygen in the gas stream after occurrence of said reduction of said nitrogen oxides, thereby forming a cleaned gas;

gradually cooling said cleaned gas from said temperature at said central portion to said exit gas temperature thereby recovering heat from said cleaned gas into said combustion exchanger as said as travels from said central portion to said gas exit.

* * * * *